Figure 1:
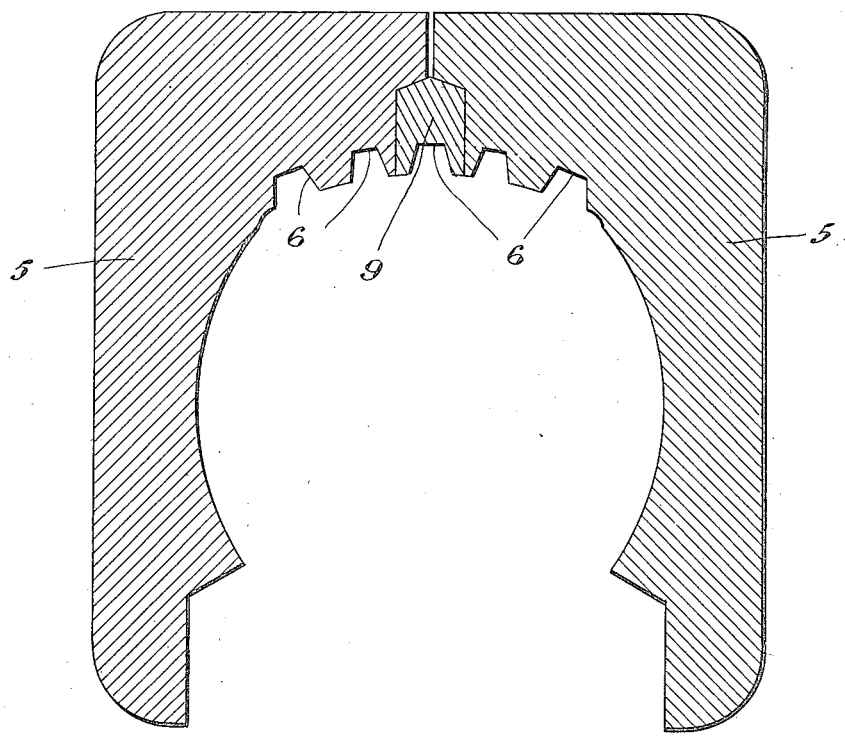

M. GREENSPAN.
TIRE MOLD.
APPLICATION FILED OCT. 3, 1921.

1,404,847. Patented Jan. 31, 1922.

Inventor:
Marius Greenspan

Attorneys.

UNITED STATES PATENT OFFICE.

MARIUS GREENSPAN, OF CHICAGO, ILLINOIS.

TIRE MOLD.

1,404,847. Specification of Letters Patent. Patented Jan. 31, 1922.

Application filed October 3, 1921. Serial No. 505,019.

*To all whom it may concern:*

Be it known that I, MARIUS GREENSPAN, a citizen of the United States, residing at Chicago, in the county of Cook and State of Illinois, have invented new and useful Improvements in Tire Molds, of which the following is a specification.

This invention relates to molds employed in the manufacture of pneumatic tire casings, and its object is to provide the mold with a novel means for obtaining a perfect finish of the tread portion of the casing.

Molds of the kind stated are usually formed in halves, the two sections meeting at the center of the casing tread, and where a non-skid tread is to be produced by means of protuberances having recesses, there is apt to occur at the center of the tread a partial filling up of such recesses due to imperfect or broken-away mold projections on the line of the joint between the mold sections.

The objectionable feature noted has been overcome by the device which is the subject matter of the present application for patent, and in order that the same may be better understood, reference is had to the accompanying drawing, forming a part of this specification.

Figure 2:
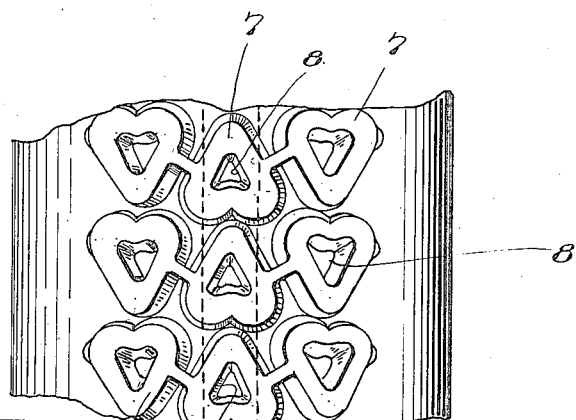

In the drawing,

Figure 1 is a cross-section of the mold, and Fig. 2 is a plan view of a fragment of the tire casing produced by the mold.

Referring specifically to the drawing, 5 denotes the two sections of the mold, the same being shaped so that when they are assembled there is had an internal cavity conforming to the cross-sectional contour of the tire casing. The joint between the two sections of the mold coincides with the longitudinal center line of the tire casing. That portion of the wall of the cavity which is to form the non-skid tread of the casing has recesses 6 which are arranged and shaped to produce recessed protuberances on the casing tread. Fig. 2 shows these protuberances at 7, they being heart-shaped, with substantially triangular recesses 8 at the center of each protuberance.

It will be noted that there is a line of protuberances 7 at the longitudinal center line of the tread, and as the joint between the two mold sections 5 coincides with this portion of the tread, it intersects the recesses 8 of said center protuberance. With a mold as ordinarily constructed, these center recesses are often not perfectly formed, due to the fact that those projections of the mold which line the joint, and produce the recesses in the tire tread, form more or less imperfectly in the casting; or, being at the edge of the mold section suffer breakage in handling. Broken or imperfect mold projections accordingly cause a total or partial filling up of the recesses intended to be formed in the tire tread, marring the appearance of the central portion of the tread.

In order to overcome this objectionable result, the opposite faces of the mold sections, at the tread portion, are recessed to seat a ring 9 of such width as to overlap the joint. This ring seats snugly in the recess, and is secured permanently to one of the mold sections so as to form a part of it when the sections are separated. The ring is of steel, and its inner surface is clearly cut or pressed with the tread design to match and form a part of the design at each side. Thus the central portion of the mold is perfect, resulting in a corresponding tread center.

The operation upon the cast mold sections for the fitting of the ring 9 can be performed without breaking or marring any of the smaller projections, so that after the mold is finished, the design on the joint lines is entire and clear cut; also the contiguous edges of the cast portions of the mold are not readily exposed to collision with each other or with other objects, eliminating the danger of their being chipped or broken off.

The ring 9, though properly fitted, may occasion two longitudinal fissures in the mold at the point where the edges of the ring join the latter. These fissures would ordinarily produce two sharp surface rings in the tread, due to flow of rubber into them. However, such rings have been found to be hardly noticeable, and do not detract from the appearance of the tread.

I claim:

1. A mold for tire casings, comprising matching sections having their joint at the tread forming portion coinciding with the longitudinal center line of the tread, the opposing faces of the sections at said joint being recessed, and provided on opposite sides of the recess with a tread design, and a ring seating in said recess, and having on its periphery which faces the interior of the mold a design which forms a continuation of the design on the mold sections, said ring overlapping the joint between the mold sections and having its sides located on opposite sides of said joint.

2. A mold for tire casings, comprising matching sections having their joint at the tread forming portion coinciding with the longitudinal center line of the tread, and provided with a tread design on opposite sides of the joint, and a ring between the mold sections at said joint, said ring having on its periphery which faces the interior of the mold a design which forms a continuation of the design on the mold sections.

In testimony whereof I affix my signature.

MARIUS GREENSPAN.